(12) United States Patent
Gleason et al.

(10) Patent No.: US 9,307,158 B2
(45) Date of Patent: Apr. 5, 2016

(54) ELECTRO-OPTIC APERTURE DEVICE

(71) Applicant: Apple Inc., Cupertino, CA (US)

(72) Inventors: Jeffrey Nathan Gleason, San Francisco, CA (US); Henry H. Yang, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 14/146,259

(22) Filed: Jan. 2, 2014

(65) Prior Publication Data

US 2014/0192257 A1    Jul. 10, 2014

Related U.S. Application Data

(60) Provisional application No. 61/893,609, filed on Oct. 21, 2013.

(51) Int. Cl.
| | |
|---|---|
| H04N 5/235 | (2006.01) |
| G02F 1/15 | (2006.01) |
| G01J 1/04 | (2006.01) |
| H04N 5/238 | (2006.01) |
| H04N 5/225 | (2006.01) |
| G02F 1/153 | (2006.01) |

(52) U.S. Cl.
CPC .............. H04N 5/2353 (2013.01); G01J 1/04 (2013.01); G02F 1/153 (2013.01); H04N 5/2254 (2013.01); H04N 5/238 (2013.01)

(58) Field of Classification Search
CPC ... H04N 5/238; H04N 5/2351; H04N 5/2254; H04N 5/2353; G02F 1/15; G02F 1/153; G01J 1/04

USPC .................. 348/362, 363, 335, 376; 359/273
See application file for complete search history.

(56) References Cited

U.S. PATENT DOCUMENTS

| | | | |
|---|---|---|---|
| 4,054,890 A | 10/1977 | Shimomura | |
| 4,218,120 A | 8/1980 | Kawamura et al. | |
| 4,400,072 A | 8/1983 | Suzuki et al. | |
| 4,526,454 A | 7/1985 | Suzuki et al. | |
| 5,471,339 A * | 11/1995 | Ise et al. .................. | 359/275 |
| 6,426,492 B1 * | 7/2002 | Bos et al. ................ | 348/E5.035 |

(Continued)

FOREIGN PATENT DOCUMENTS

| | | |
|---|---|---|
| EP | 0257675 | 3/1988 |
| FR | 2 495 420 A1 | 6/1982 |

(Continued)

OTHER PUBLICATIONS

"Advancement of Electrochromic Windows", PIER Final Project Report, Prepared for: California Energy Commission, Prepared by: Lawrence Berkeley National Laboratory, Apr. 2006, CEC-500-2006-052, (101 pages).

(Continued)

*Primary Examiner* — Nhan T Tran
(74) *Attorney, Agent, or Firm* — Blakely, Sokoloff, Taylor & Zafman LLP

(57) ABSTRACT

An electro-optic aperture has a stack that includes a front transparent conductor medium, an active electro-chromic medium, and a rear transparent conductor medium. The front and rear transparent conductor mediums are directly connected to each other by a conductive section located within the imaging path. Other embodiments are also described and claimed.

35 Claims, 8 Drawing Sheets

(56) References Cited

U.S. PATENT DOCUMENTS

| | | |
|---|---|---|
| 6,621,616 B1* | 9/2003 | Bauer et al. ............... 359/273 |
| 7,477,310 B2 | 1/2009 | Makii |
| 7,585,122 B2* | 9/2009 | Erom ki ............... 396/506 |
| 2003/0125080 A1* | 7/2003 | Shimamura ............... 348/376 |
| 2004/0047050 A1 | 3/2004 | Bauer et al. |
| 2007/0133983 A1* | 6/2007 | Traff ............... 396/506 |
| 2007/0139792 A1* | 6/2007 | Sayag ............... 359/739 |
| 2007/0216803 A1 | 9/2007 | Eromaki |
| 2007/0242201 A1 | 10/2007 | Hyatt |
| 2009/0161239 A1 | 6/2009 | Verhaar et al. |
| 2010/0134866 A1 | 6/2010 | Foller et al. |
| 2012/0019713 A1 | 1/2012 | Gudlavalleti et al. |
| 2012/0249829 A1 | 10/2012 | Izuha et al. |
| 2013/0016188 A1 | 1/2013 | Ogasahara |
| 2013/0215489 A1 | 8/2013 | Blackburn et al. |

FOREIGN PATENT DOCUMENTS

| | | |
|---|---|---|
| JP | H06 317815 A | 11/1994 |
| JP | 2000-116258 | 5/2009 |
| WO | WO-0049455 | 8/2000 |
| WO | WO 2009/038265 A1 | 3/2009 |
| WO | WO-2009038265 A1 | 3/2009 |
| WO | WO-2010065713 A1 | 6/2010 |

OTHER PUBLICATIONS

PCT International Search Report and Written Opinion of the International Searching Authority for PCT/US2014/010235, mailed Apr. 2, 2014.

Non-Final Office Action (dated Jun. 25, 2015), U.S. Appl. No. 14/146,521, filed Jan. 2, 2014, First Named Inventor: Jeffrey Nathan Gleason, (15 pages).

PCT International Preliminary Report on Patentability and Written Opinion (dated Jul. 16, 2015), International Application No. PCT/US2014/010235, International Filing Date Jan. 3, 2014, (9 pages).

Deutschmann, T., et al., "Integrate electrochromic iris device for low power and space-limited applications", J. Opt. vol. 16, No. 7, pp. 75301-75305(5), 2014.

* cited by examiner

ELECTRO-OPTIC APERTURE DEVICE

RELATED MATTERS

This non-provisional application claims the benefit of the earlier filing date of provisional application No. 61/748,988 filed Jan. 4, 2013, provisional application No. 61/817,498 filed Apr. 30, 2013, and provisional application No. 61/893,609 filed Oct. 21, 2013.

An embodiment of the invention relates to a variable solid-state aperture for a camera that may be integrated within a portable consumer electronics device. Other embodiments are also described.

BACKGROUND

Camera modules have been incorporated in a variety of consumer electronics devices, such as smart phones, mobile audio players, personal digital assistants, laptop and tablet computers, as well as desktop personal computers. A typical digital camera module is an assembly in which at least the following components have been integrated: a microelectronic imaging sensor integrated circuit chip, a printed circuit carrier such as a flexible circuit structure which carries power and signal connections between the sensor chip and other circuitry inside the consumer electronics device, and an optical system which includes a fixed focal length lens subsystem or autofocus lens subsystem. There may be additional optical elements such as infrared filters and neutral density filters. Typically, in most consumer electronics portable devices, such as smart phones and tablet computers, that have a relatively thin profile (or a so-called shallow z-height), the various optical path apertures in the optical system are of the fixed variety. That is in part because conventional variable apertures that use leaflets for example are not only complex (adding to the cost of the device as a whole) and more susceptible to physical shock or damage, but they also require additional headroom in the z-height direction, thereby leading to a thicker smartphone or tablet computer.

There has been a suggestion to use an electro-optic aperture in an imaging system, in order to avoid the use of moving parts while at the same time achieving improved focusing and greater depth of field. The electro-optic aperture may include an electro-chromic (EC) medium that attenuates light from the scene that is passing through the aperture, in response to a voltage being applied to a pair of transparent conductor layers between which the EC medium is sandwiched. An abrupt void or gap is formed in one of the transparent conductor layers, so as to form a ring-like aperture whose inner area remains transparent when the EC medium is energized and whose outer area becomes dark, thereby yielding in effect a smaller pupil. The electro-optic aperture may be positioned between a focusing lens of the system and the scene being imaged.

SUMMARY

An embodiment of the invention is a portable consumer electronics device described as having a hand held portable device housing, and an electronic camera module that is integrated in the housing. The module has a focusing lens to focus light from a scene, and an imaging sensor to receive the focused light. An electro-optic variable aperture is provided to allow different amounts of light from the scene to reach the imaging sensor (through the focusing lens). The aperture has a stack that includes a front transparent conductor medium, an electrolyte medium, an active EC medium, and a rear transparent conductor medium. A driver circuit that can produce a variable voltage is coupled to the transparent conductors, so as to apply the variable voltage to thereby change the active EC medium between dark and clear states, as desired. In one embodiment, the voltage may be continuously varied to achieve a continuously variable desired darkness or color level in the EC medium, or it may be varied across discrete levels. In one instance, applying a greater activation voltage yields in effect a smaller pupil, that is, a greater f-number. In that case, the aperture is passing less light so that a darker optical image is projected onto the image sensor. Conversely, if the driver produces a smaller activation voltage, then the EC medium becomes less dark and/or has less color effectively yielding a larger or wider pupil; this allows increased light from the scene to reach the imaging sensor. The process is reversible in that the driver can also produce a voltage that returns the EC medium to its clear state. Such a variable aperture allows for flexible fine-tuning of the final exposure at which a picture of the scene is captured.

In one embodiment, the EC medium has a layer of active EC material that is oriented substantially perpendicular to an optical axis of the camera module but that has a tapered thickness. In particular, the layer of active EC material may be substantially ring-like or annular in that the tapered thickness drops to essentially zero in an inner region of the layer, where this inner region may be substantially centered or aligned with the optical axis.

In another embodiment, the front transparent conductor medium is a patterned layer, so that a ring-like electric charge flow is generated through the EC medium when the activation voltage is applied to the conductor mediums (to thereby achieve in effect a smaller pupil). The patterned layer may have a gap or hole formed therein that may be substantially centered or aligned with the optical axis. This gap may be filled with an optical material different than the transparent conductor material and that has a desired index of refraction, or it may be simply left as an open space full of air.

In yet another embodiment, an inner plug region is formed in the front transparent conductor medium, where the plug region is of the same material as, but is electrically isolated from, an outer region of the transparent conductor medium. This technique may also yield a ring-like charge field through the EC medium (when the activation voltage is applied to the outer region of the front transparent conductor medium and to the rear conductor medium, in order to effectively produce a smaller pupil).

In yet another embodiment, the electrolyte medium has an ion source medium (positioned adjacent to the front conductor) that is in contact with an ion conduction medium (which is adjacent to the EC medium). The ion conduction medium in this embodiment is a patterned layer so that once again a ring-like charge filed is generated through the EC medium, when the activation voltage is applied to the transparent conductor mediums. In particular, a hole may be formed within an inner region of the layer of ion conduction medium, such that insubstantial electrical current is generated through the EC medium that lies directly underneath the hole thereby allowing that portion of the EC medium to remain clear even when the activation voltage is being applied.

In yet another embodiment, the stack of the electro-optic variable aperture further includes a conductive section located in the imaging path, and that directly connects the front and rear transparent conductor mediums. When the driver circuit applies a voltage (which may be variable) to the transparent conductor mediums, in order to change the active EC medium between dark and clear states, a region of the EC medium at and immediately surrounding the conductive section remains relatively clear due to the essentially zero voltage or potential difference across that region (by virtue of the conductive section being present). At the same time, the EC medium becomes progressively darker moving away from the conductive section, that is in a transverse direction towards the periphery of a cross-section of the imaging path, because the potential difference across the EC medium steadily increases in that direction. In one embodiment, the width or thickness of the conductive section may govern the minimum pupil size, where a larger conductive section results in a larger region in the imaging path that remains at essentially zero potential difference.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
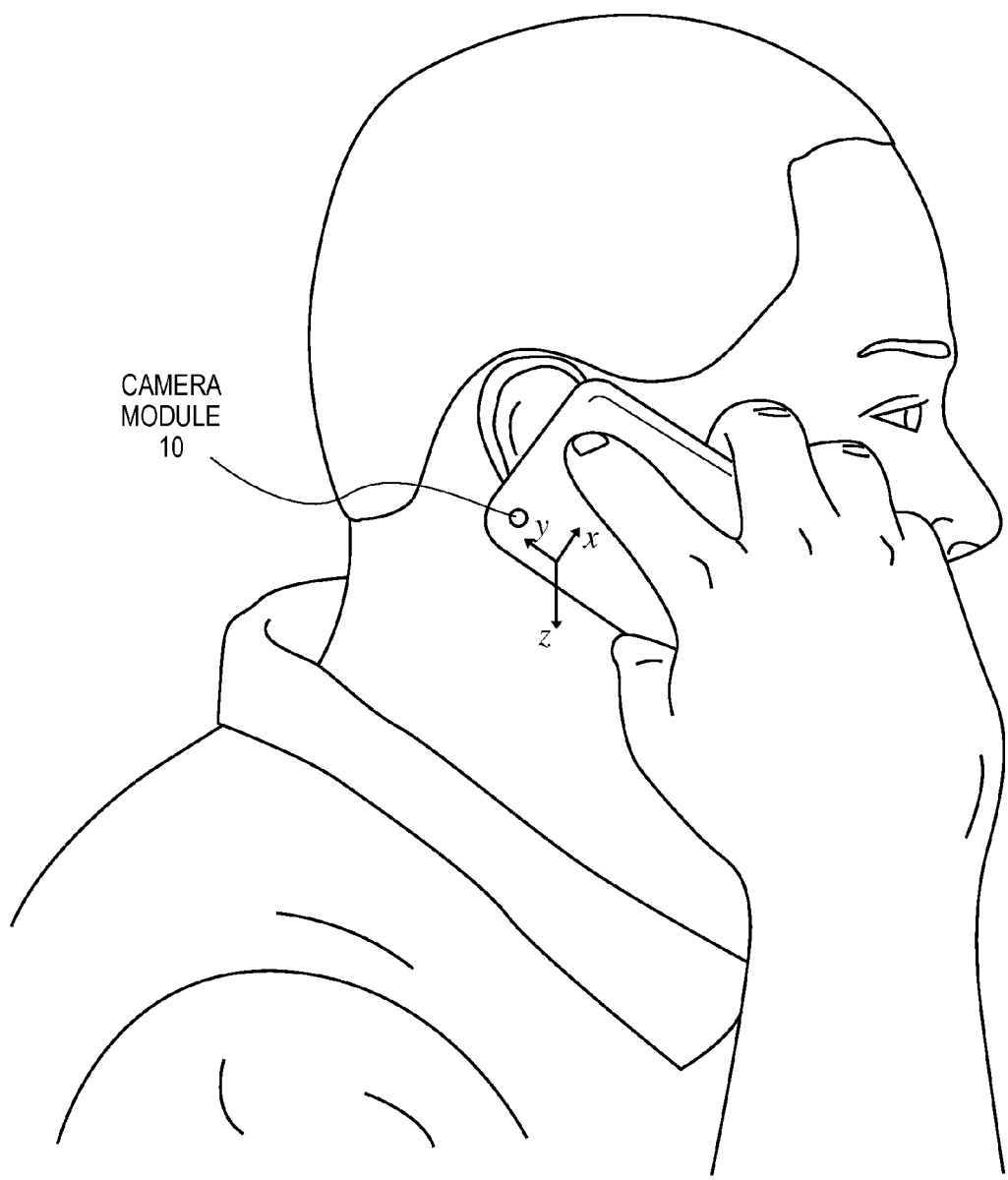
FIG. 1 depicts a portable consumer electronics device in which a camera module having an E-O variable aperture is integrated.

FIG. 1 depicts an example portable consumer electronics device in use by the end user, and in which a camera module 10 is integrated. In this example, the device is a smart phone having a front face that is up against an ear of the user during a phone call that is being conducted. The rear face has an opening through which the camera module 10 is visible. The camera module 10 may alternatively be integrated within other portable consumer electronics devices such as tablet computers and laptop or notebook computers. The camera module 10 could also be integrated in non-portable consumer electronics devices and in particular those where the so-called thickness or z-height or depth of the external housing is limited, making it difficult to use a mechanically variable aperture. An embodiment of the invention is an electro-optically (E-O) variable aperture that is particularly suitable for use in the tight confines of such devices.

Figure 2:
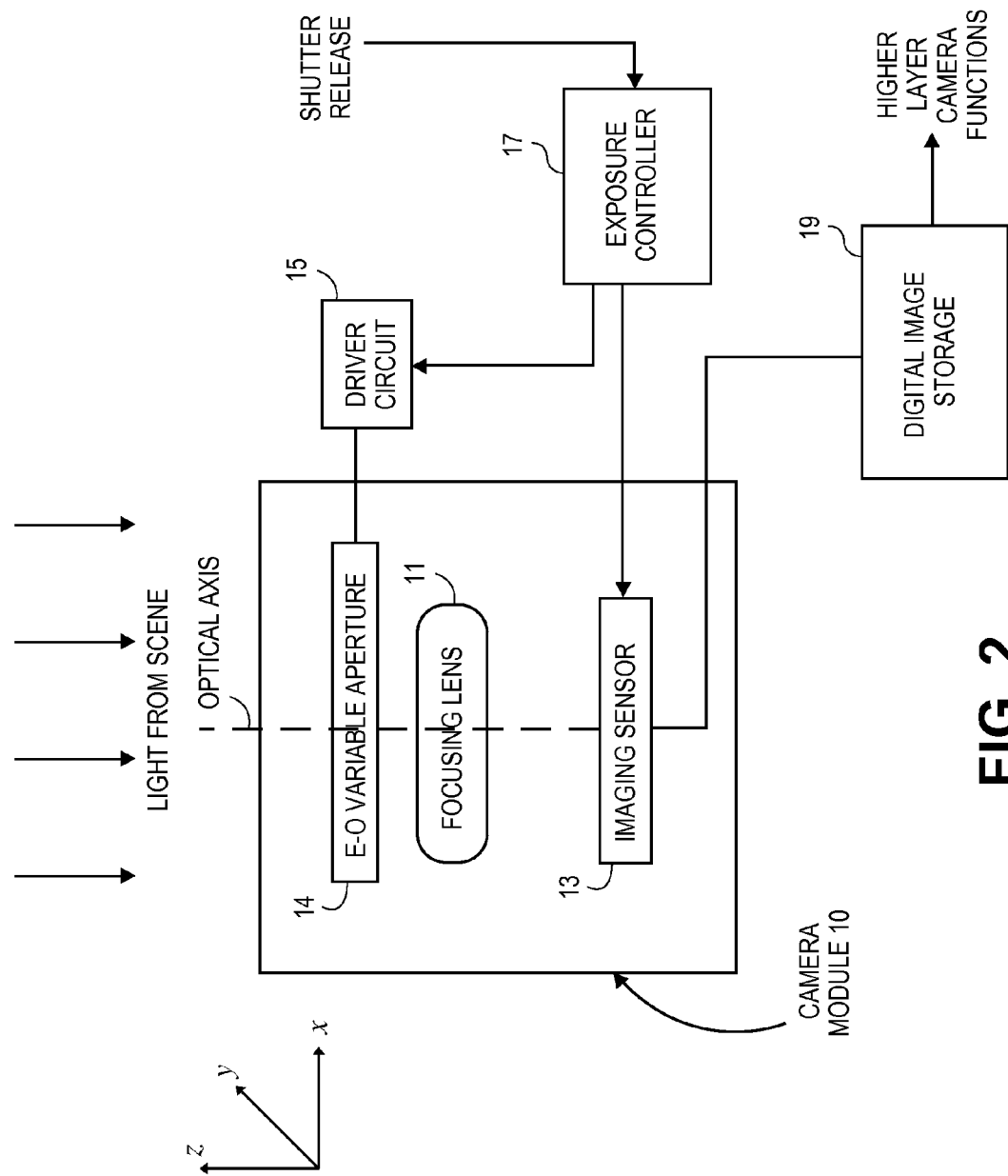
FIG. 2 is a block diagram of camera-related elements including a camera module and associated electronics circuitry.

FIG. 2 is a block diagram of the camera module 10 together with electronic circuit elements that are needed to implement the camera function. Note that there may be additional functions that are implemented in the consumer electronics device as is known to those of ordinary skill in the art but that are not described here in the interest of conciseness, e.g. communication network interfaces, display screens, touch screens, keyboards, and audio transducers. The camera module 10 has an imaging sensor 13 that is part of an optical system, which also includes a focusing lens 11 and an E-O variable aperture 14. These optical elements are aligned to an optical axis as shown. Note however, that while in this particular example all of the optical elements are in a straight line, in other embodiments there may be a mirror or other optical deflector that allows one or more of the elements to be positioned off of a straight line. Nevertheless, those elements may still be considered "aligned with the optical axis." What is shown in FIG. 2 is a particularly efficient mechanism (in terms of packaging) that can fit within the tight confines of a low z-height device such as a smart phone, a tablet computer, or a laptop computer, where, in particular, all of the optical interfaces are positioned substantially parallel to a front or rear face of the external housing of the device. In other words, each optical element lies flat within an x-y plane with its height given in the z-direction shown.

The imaging sensor 13 may be any conventional solid-state imaging sensor such as a complimentary metal oxide semiconductor (CMOS) sensor chip, which presents an interface to an exposure controller 17 to receive certain parameters for determining an exposure for taking a picture. The sensor parameters may include pixel integration time, which may be set by the exposure controller 17 in accordance with any suitable exposure control algorithm that considers various input variables (e.g., level of scene illumination and the availability of a flash or strobe illumination). The exposure controller 17 may automatically perform the algorithm to determine an appropriate exposure setting, and then signal the imaging sensor to update its parameters in response to a manual shutter release command (e.g., in response to a mechanical or virtual shutter button being actuated by a user of the device). The exposure controller 17 may be implemented as a programmed processor or as a completely hardwired logic state machine together with stored parameter options. Once a digital image has been captured by the imaging sensor 13 under the chosen exposure setting, it may be transferred to a digital image storage 19 (e.g., solid state volatile or non volatile memory), prior to being further processed or analyzed by higher layer camera functions that yield for example a still picture file (e.g., in a JPEG format) or a video file (e.g., in a digital movie format).

Also included in the camera module 10 is a focusing lens 11 which may include one or more lens elements that serve to focus light from the scene onto the imaging sensor 13 (thereby producing an optical image on an active pixel array portion of the imaging sensor 13). The focusing lens 11 may include either a fixed focus optical subsystem, or a variable focus subsystem that implements an autofocus mechanism. There may also be an optical zoom mechanism, as part of the focusing lens 11. In the case of an optical zoom lens and/or an auto focus mechanism, additional control parameters relating to lens position can be set by the exposure controller 17 for each exposure to be taken, as is apparent to those of ordinary skill in the art.

The camera module 10 also has the E-O variable aperture 14, which for the sake of simplicity is shown as being positioned in front of the focusing lens 11. The aperture 14 effectively implements a pupil whose width or size is electrically variable. The aperture 14 may be positioned at any suitable aperture location along the optical axis in front of the imaging sensor 13. When the aperture 14 has been electrically controlled into a small or narrow pupil, highly collimated rays are admitted by it, which results in a sharp focus at an image plane of the optical system. On the other hand, when the aperture 14 is configured into a large or wide pupil, un-collimated rays are admitted resulting in an optical image that is sharp around what the focusing lens 11 is focusing on, and may be blurred otherwise. The aperture 14 thus determines how collimated the admitted rays of light from the scene are, that ultimately come to a focus in an image plane. The aperture 14 also determines the amount of incident light or how many incoming rays are admitted, and thus how much light reaches the imaging sensor, where of course the narrower the aperture the darker the digital image that is captured by the sensor 13 (for a given integration time). Control of the effective pupil size of the aperture 14 is achieved using an electronic driver circuit 15, which may receive a control signal or command from the exposure controller 17 that may represent the desired size of the effective pupil. The driver circuit 15 translates this input command into a drive voltage that is applied to the input transparent conductors of the aperture 14, as described below.

Figure 3:
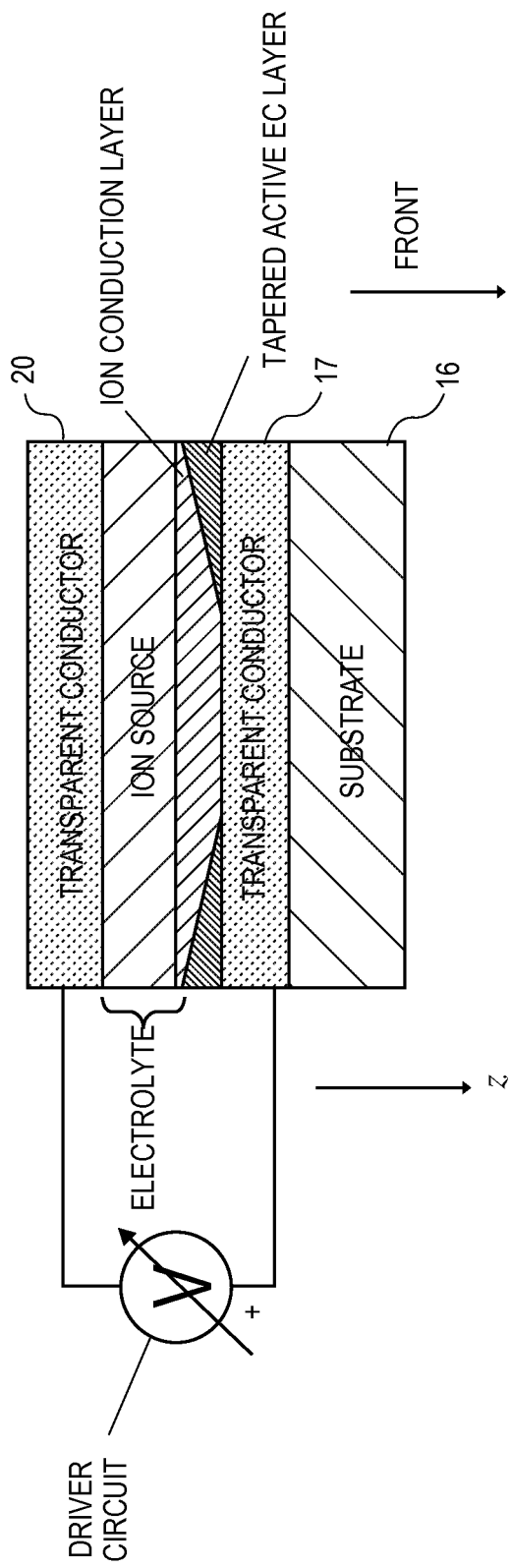
FIG. 3 is a cutaway view of an E-O variable aperture in accordance with an embodiment of the invention.

Turning now to FIG. 3, a cutaway view of the aperture 14 in accordance with an embodiment of the invention is shown. As can be seen, the aperture 14 has a stack that includes a front transparent conductor medium 17 which in this example is connected to the "+" terminal of the driver circuit, an electrolyte medium, an active EC medium, and a rear transparent conductor medium 20 (connected to the complimentary terminal of the driver circuit). In one embodiment, the elements of the stack are formed to be in contact with one another as they are depicted in the figure, i.e. the electrolyte medium is formed as a layer whose surface is in contact with the rear transparent conductor layer 20, and whose opposite surface is in contact with the active EC medium, e.g. an active EC layer, while a surface of the latter is in contact with the front transparent conductor layer 17.

In one embodiment, the electrolyte medium consists of an ion source medium that is adjacent to the rear transparent conductor 20 and is in contact with an ion conduction medium, which in turn is adjacent to the active EC layer. Here, an ion source layer is formed that is not in contact with the active EC layer, but rather is in contact with the ion conduction layer, the latter being in contact with the active EC layer. In other words, the ion conduction layer is entirely sandwiched between the ion source layer and the active EC layer. This arrangement may also be found in other embodiments of the aperture 14, for instance as they are depicted in the cut away views of FIGS. 4-6.

The ion source layer stores suitable ions, for example, lithium ions, that will be used for activating the EC layer when a sufficient charge field, that may be generally vertically directed in the context of the figures here, has been generated between the transparent conductor layers 17, 20. In addition, the ion source layer should be sufficiently clear or transparent to allow light rays from the scene to pass through (in a generally vertical direction in the context of the figures here). The ion source layer may also be referred to as a counter electrode layer.

The ion conduction layer allows for high mobility of the ions that have been produced by the ion source when entering the active EC layer.

Figure 8:
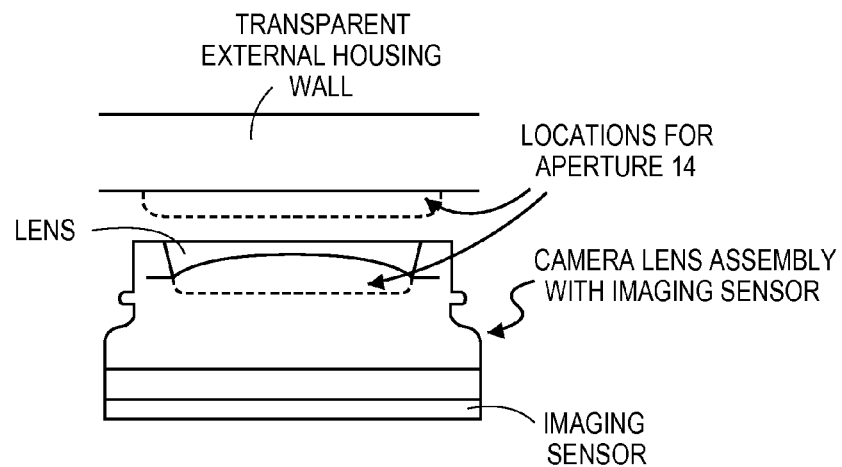
FIG. 8 shows two locations, in the optical system of a camera module integrated in a consumer electronics device, in which the E-O aperture may be placed.

The transparent conductor layers 17, 20 in the front and rear may be formed on the respective surfaces of a front substrate and a rear substrate. Alternatively, there may be only one substrate, e.g. a front substrate 16 as shown in FIG. 3 on which the stack-up of layers, shown in all of the figures here as starting with the transparent conductor layer 17, may be formed. The substrate may be a lens or it may be an external housing wall of a consumer electronic device (e.g., a smartphone or a tablet computer) that is spaced apart from the lens—see FIG. 8. The substrate may be made of glass, polycarbonate, or other suitable material or composition that is transparent enough for use in an optical system of a consumer electronics camera and that can be used to support the formation of the transparent conductor layers 17, 20.

A transparent conductor may be, for example, a layer of indium tin oxide (ITO) or other transparent conductive material that is formed as a relatively thin layer. The transparent conductor provides a conductive path for charge from the driver circuit to be applied to the ion source while at the same time allowing the free passage of light rays from the scene. In this case, the front transparent conductor layer 17 is formed on a rear face of the front substrate 16. Note that the references here to "front" and "rear" are only to make it easier to describe the structure of the aperture 14 and are not intended to be otherwise limiting. For example, in one embodiment, the incident light enters that stack up through the front substrate 16 that is at the bottom of the stack shown in FIG. 3; the aperture 14 may also work where the incident light from the scene enters the aperture in the reverse direction, e.g. through a rear substrate.

Still referring to FIG. 3, in this embodiment, the active EC layer is tapered at its edge as shown, forming a gradual ring rather than having an abrupt or step-like edge. The ring-shape is apparent as viewed from above (not shown). In other words, while the EC layer spreads substantially perpendicular to an optical axis of the camera module 10 (see FIG. 2) it does not have uniform thickness and instead has a tapered thickness that drops to essentially zero within an empty inner region of the EC layer as shown in FIG. 3. In this case, this empty inner region is substantially aligned with or centered with the optical axis. The downward tapering of the EC layer makes way for the material of the ion conduction layer to fill that gap, resulting in a substantially frusto-conical shape for the ion conduction layer as seen in FIG. 3. The tapered active EC layer thus presents a minimum pupil width for the aperture 14, being in this case co-extensive with the bottom of the tapered active EC layer.

In operation, the aperture 14 presents effectively a wide pupil so long as there is insufficient current through the outer region of the EC medium, which can be achieved when essentially zero voltage is being applied by the driver circuit to the front and rear transparent conductors. When the driver increases the voltage, ions are forced to travel from the electrolyte medium through the tapered active EC layer, which darkens that outer region of the EC layer. Here it should be noted that the darkness of the EC layer depends on the thickness at that point, in addition to the strength of the current at that point. Thus, the darkness change in the tapered EC layer is gradual in that the darkness increases as one moves outward, away from the center optical axis, for a given fixed voltage. The shape of the taper at the edge of the EC layer may be tuned in order to tune the diffraction qualities of the optical system. This may help create a sharper image on the imaging sensor 13 (see FIG. 2) than an E-O aperture that has an abrupt edge within the active EC layer. For example, tuning the edge of the EC layer may help reduce color aliasing artifacts by reducing spatial frequency response at very high frequencies, and increasing low spatial frequency response (sharpness).

Although not shown in the drawings, a top view of the aperture 14 reveals that the inner region which may be centrally aligned with the optical axis may be formed into any suitable shape, although it is expected that a circular shape may produce improved results in that it matches the naturally circular shape of a lens element of the focusing lens 11. Also, while there are several references here to a "ring" or "ring-like" shape, this does not mean that the external boundary of that shape is necessarily also circular, but rather that the shape is merely annular in that there is an essentially empty inner region surrounded by a non-empty outer region.

The overall process of activation and deactivation of the EC layer is reversible, so that the outer region of the active EC layer can transition from a substantially clear (transparent) state into a colored or dark state (in response to sufficient current being produced through it) and back (when the activation voltage is removed).

In one embodiment, in its clear state (e.g., at zero drive voltage), the aperture 14 has at least 95 percent transmission of light in a visible band of interest (for consumer electronics digital photography); when the effective pupil diameter is then decreased by three "aperture stop" steps (where each step reduces the diameter by a factor of square root of 2, or about 1.414, hence a halving of the effective area of the pupil), the aperture 14 should still exhibit at least 75 percent light transmission.

Figure 7:
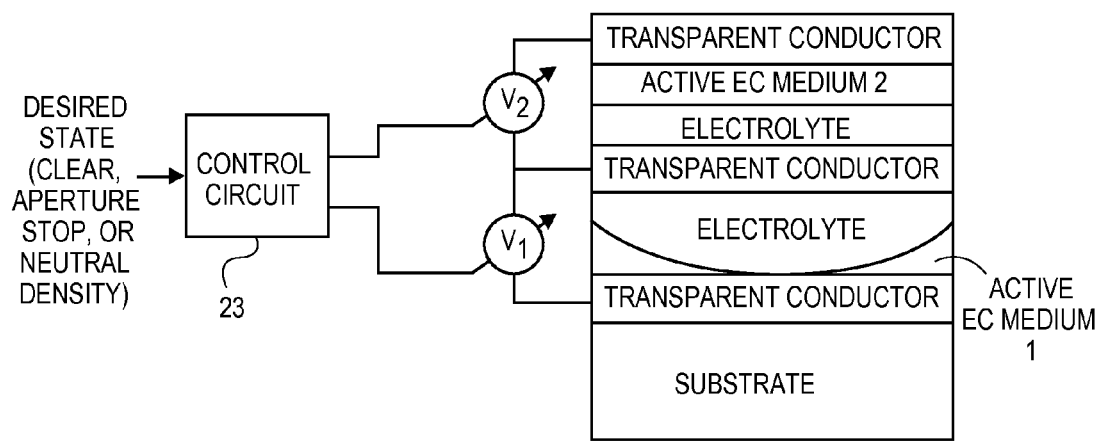
FIG. 7 is a cutaway view of a camera E-O aperture structure that can have at least three states, including a neutral density filter state.

In one embodiment, referring now to FIG. 7, a stack-up according to FIG. 3 having active EC medium 1 is combined with another stack-up having EC medium 2. This enables the structure as a whole (shown in FIG. 7) to be controlled or switched into three states, namely a clear state, a dark aperture stop (or stopped down) state, and a neutral density state in which the aperture as a whole exhibits substantially homogeneous reduction in intensity of light from the scene (across all visible colors or wavelengths of interest). A control circuit 23 translates the input request into suitable driver voltage settings of variable voltage sources $V_1$ and $V_2$ which in turn cause the active EC media 1, 2, respectively, to exhibit the proper opacity.

Figure 4:
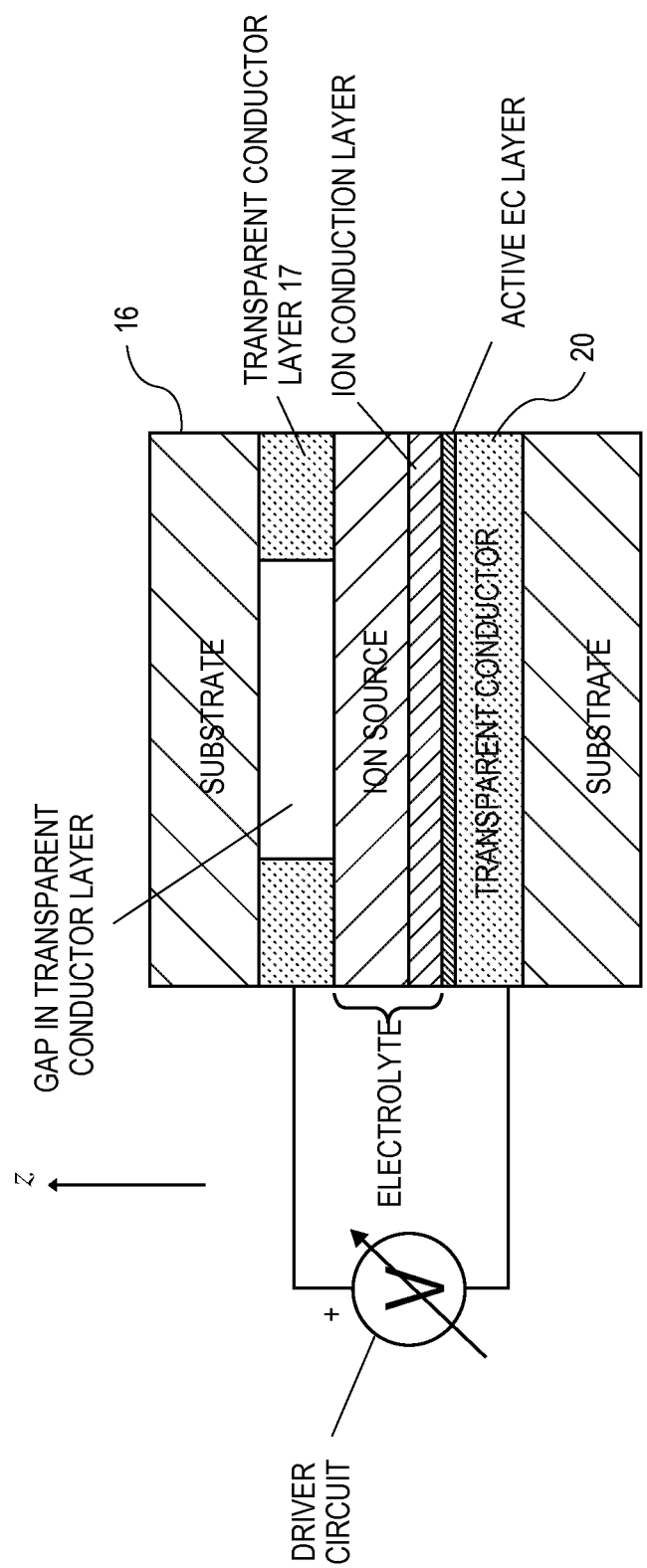
FIG. 4 is a cutaway view of an E-O variable aperture in accordance with another embodiment.

Turning now to FIG. 4, a cut away view of another embodiment of the invention is shown, where in this case the aperture stack is formed such that its front transparent conductor medium or layer 17 is a patterned layer. In particular, as shown in FIG. 4, the front transparent conductor layer 17 has a gap or hole formed in it (e.g., through chemical or mechanical etching) that is substantially aligned with or centered with the optical axis. This gap results in insufficient current being generated through the portion of the active EC layer that lies directly under the gap, to activate that portion of the EC medium. In other words, a ring-like current is generated through the active EC layer (when the activation voltage is applied by the driver circuit). This ensures that the inner region of the aperture stack remains essentially clear, forming a minimum effective pupil width, substantially coextensive with the gap in the transparent conductor layer 17, at a high activation voltage, and yields a progressively larger pupil width as the activation voltage is reduced. In this embodiment, the EC medium consists of an active EC layer that is substantially perpendicular to the optical axis but that also has essentially uniform thickness as shown. The voltage applied by the driver circuit may be modulated or changed continuously from a low or minimum level such as zero volts, which yields a low opacity in the outer region of the EC layer, to a high voltage that yields a high opacity in the outer region of the EC layer.

Figure 5:
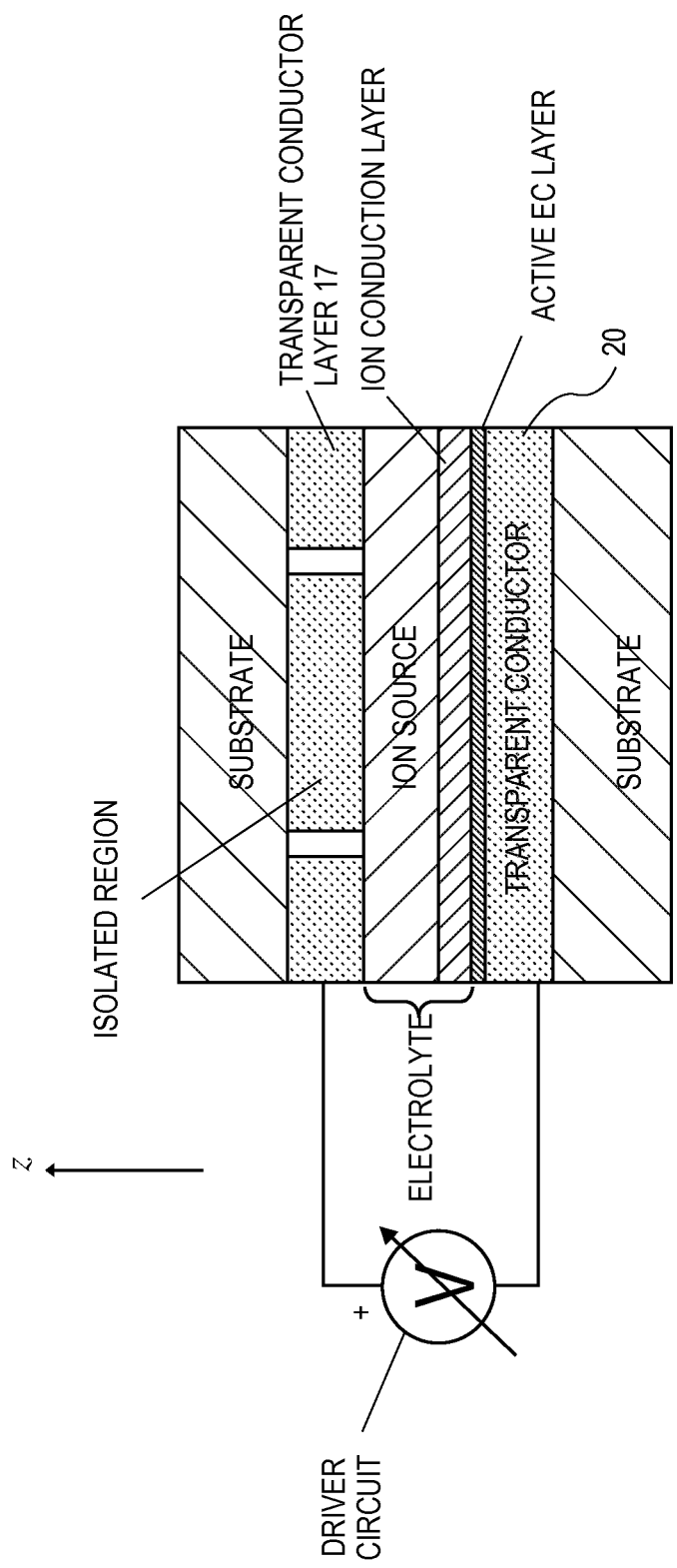
FIG. 5 is a cutaway view of yet another embodiment.

Referring now to FIG. 5, this cut away view illustrates an embodiment where the front transparent conductor layer medium 17 of the aperture stack contains an inner transparent conductor plug region, also referred to as an isolated region, i.e. electrically isolated from an outer region of the front transparent conductor medium 17. This isolated region may be essentially centered or aligned with the optical axis. It may remain electrically floating or it may alternatively be tied to a different voltage than the outer region of the front transparent conductor medium 17, while the latter is being driven to an activation voltage by the driver circuit. This mechanism again produces a ring-like current through an outer region of the active EC layer, thereby maintaining very low opacity in the inner region of the active EC layer. Thus, similar to the embodiments described above, at a high drive voltage, the outer region of the active EC layer (which is subjected to the ring-like current) reaches high opacity, while its inner region is subjected to essentially no or very low current and thus remains at low opacity.

It should be noted that a further advantage of the embodiment of FIG. 5 over that of FIG. 4 may be that the difference in optical property between the inner region of the optical path through the aperture 14 (centered or aligned with the optical axis), and the outer region of the optical path (which is subjected to greater opacity by the active EC layer) is reduced, when the drive voltage is minimum and the pupil size is at its widest. In other words, light rays from the scene that pass through the inner region of the aperture 14 will be subjected to essentially the same optical characteristics as the light rays that travel through the outer region (assuming that the effect of the physical gap shown between the isolated region and the outer region of the front transparent conductor layer 17 in FIG. 5 can be ignored). This might not be the case with the embodiment of FIG. 3 (because of the tapered active EC layer) and with the embodiment of FIG. 4 (because of the substantial gap in the transparent conductor layer 17).

Figure 6:
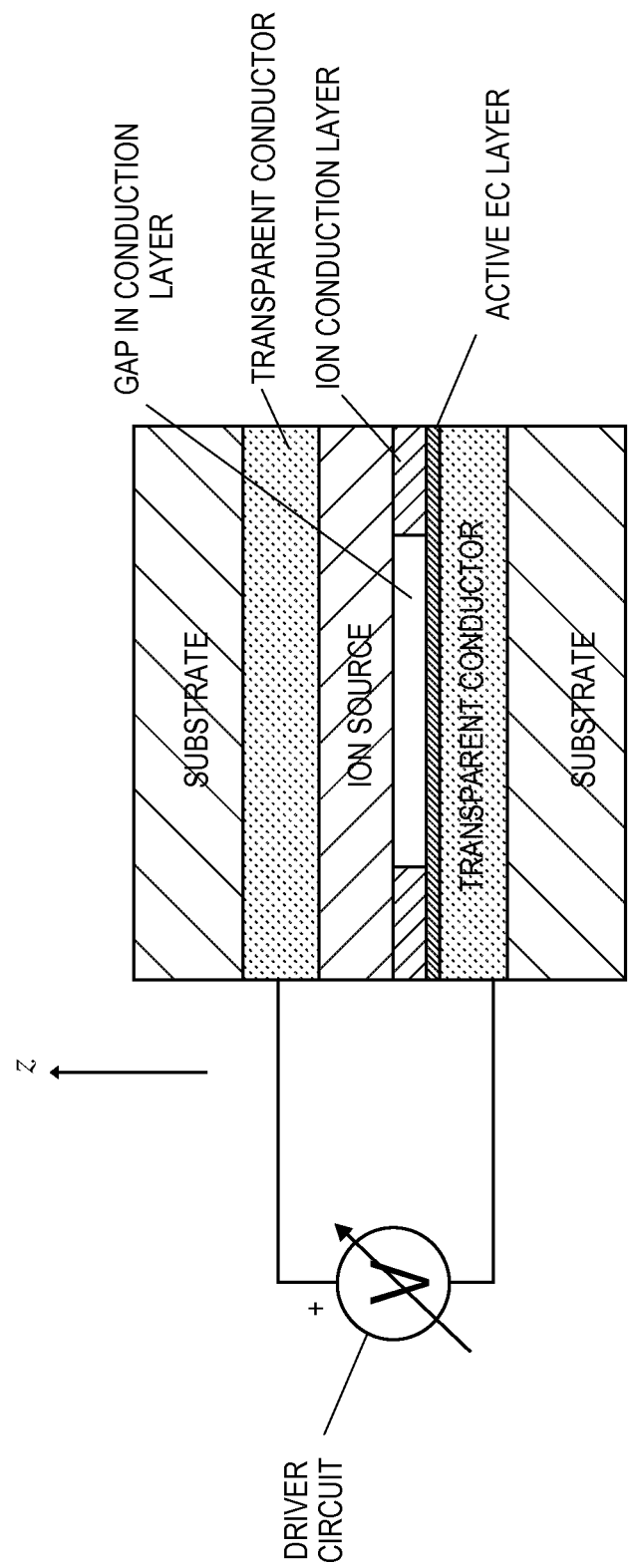
FIG. 6 is a cutaway view of a further embodiment of the E-O variable aperture.

Turning now to FIG. 6, in yet another embodiment of the aperture stack, the ion conduction medium or layer becomes a patterned layer as shown, by forming a gap or hole in what may be an otherwise uniformly thick ion conduction layer. The hole may be substantially aligned or centered with the optical axis as shown. This means that when the activation voltage is applied by the driver circuit, not enough ions from the ion source layer will be traveling through the (empty) inner region of the ion conduction layer, and thus should not impact the inner region of the active EC layer that lies directly underneath the hole. Thus, there should be no substantial darkening of the inner region of the active EC layer. Once again, a minimum effective pupil width is achieved in this case, using a different mechanism than those described in FIGS. 3-5. Once again, a ring-like current is generated through the EC layer (when the activation voltage is applied by the driver circuit) in order to reduce the width of the aperture. The minimum width or area of the aperture may correspond to essentially the size of the hole in the ion conduction layer.

Figure 9:
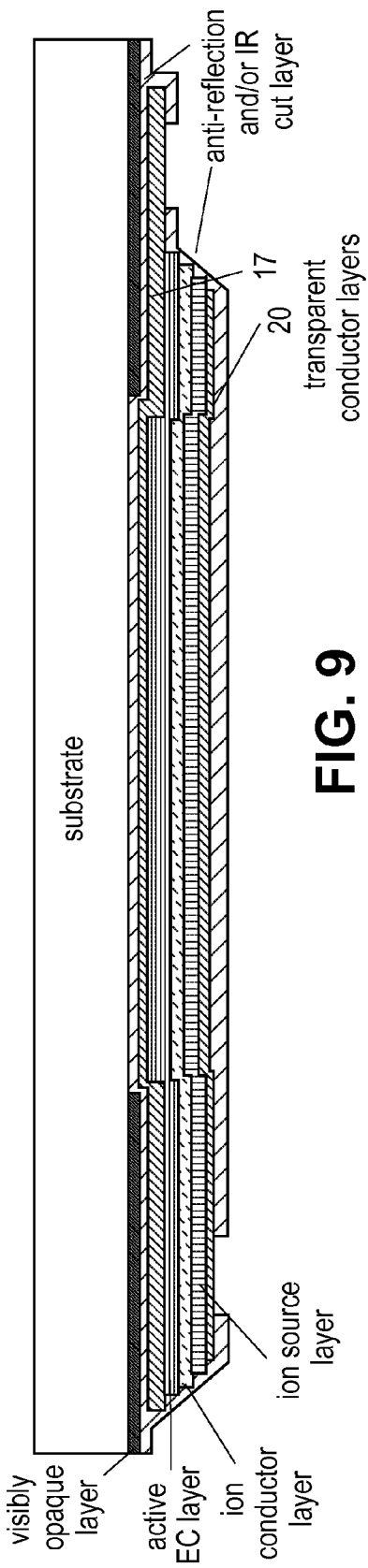
FIG. 9 is a cut-away view of an electro-optic aperture.

Turning now to FIG. 9, a section view of an electro-optic aperture is shown in accordance with another embodiment of the invention. A stack of the aperture here is similar to the embodiment of FIG. 3 in that there is a substrate on which a transparent conductor medium or layer 17 has been formed. As suggested above, the substrate may be made of any suitable material such as sapphire or glass or other sufficiently transparent material on which the stack of the electro-optic aperture may be formed. In contact with the transparent conductor medium 17 is an active EC layer, an opposite surface of which is in contact with an ion conduction layer. The latter is in contact with an ion source layer. This entire sandwich is bounded by the front and rear transparent conductor layers 17, 20. In the embodiment of FIG. 9, there is also a front anti-reflection and/or infrared (IR) cut layer that has been formed between the front transparent conductor layer 17 and the substrate. In addition, the imaging path through the aperture has been defined, in this case, by the addition of a visibly opaque layer having an inner opening. The visibly opaque layer in this example has been applied directly to the substrate, and is formed between the substrate and the adjacent anti-reflection and/or IR cut layer. Note also that openings are formed in the front anti-reflection and/or IR cut layer and a rear anti-reflection layer, so as to allow electrical contacts (not shown) to directly connect with the front and rear transparent conductor layers 17, 20, in order to apply the electro-optic aperture's activation voltage. In this case, the front and rear anti-reflection and/or IR cut layers entirely envelop or cover the aperture stack, except for the regions needed to make electrical contact (as shown).

Figure 10:
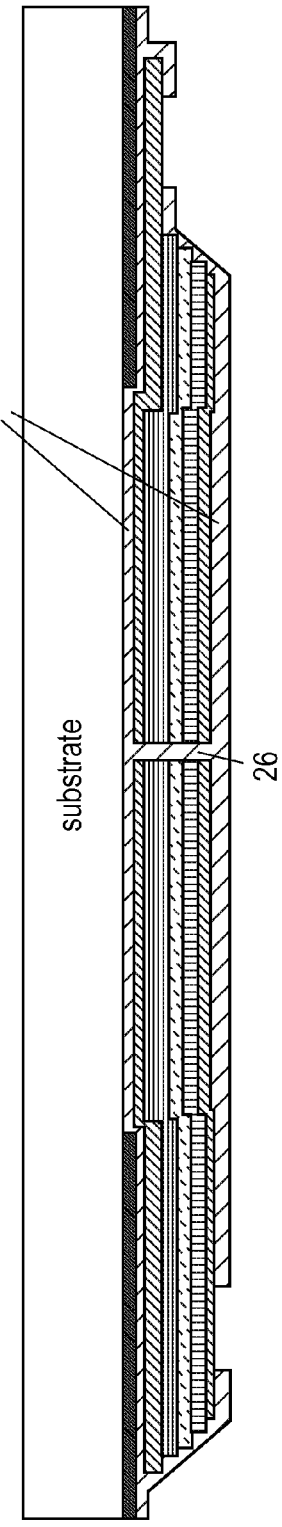
FIG. 10 is a cut-away view of an embodiment of the invention in which a conductive section has been added to directly connect the transparent conductor layers, within the imaging path.
Figure 10:
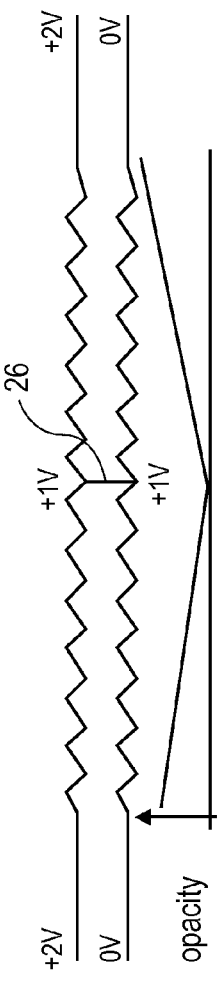

Turning now to FIG. 10, another embodiment of the invention is shown in which the stack of FIG. 9 has been modified by the addition of a conductive section 26. This is described in FIG. 10 as being a small electrical short that is located approximately at the center of the imaging path, directly connecting the two transparent conductor layers 17, 20. In one embodiment, this conductive section or short 26 is relatively small, for example, on the order of about 10 micrometers thick or wide. The conductive section may be formed somewhat similar to how a via is formed in a microelectronic manufacturing process between different metal layers of an integrated circuit. Note that the conductive section 26 may be made of the same material as the front and rear transparent conductor mediums 17, 20.

FIG. 10 also shows an example resistor circuit model of such an "apodized" aperture, in which an activation voltage of in this case 2 Volts is being applied to the two transparent conductor layers 17, 20. The conductive section 26 by virtue of being located at the center of the imaging path will have the midpoint voltage of about +1 Volt. Note, however, that the potential across the active EC medium will vary from essentially zero volts at the center (due to the presence of the conductive section 26) and progressively greater towards the periphery of the imaging path, here up to 2 Volts at the periphery. This means that the EC medium is least opaque at the center, and progressively more opaque moving outward to the periphery. It can also be seen that if the conductive section 26 is made thicker or larger, the smallest or minimum pupil size of the aperture may also be larger, because the region of the EC layer across which there is zero voltage is larger.

Although FIG. 10 shows the conductive section 26 as being oriented at about 90° relative to the front and rear transparent conductor layers 17, 20, and is located closer to a center rather than a periphery of a cross-section of the imaging path, an alternative may be to locate and orient or shape the conductive section 26 differently. In addition, there may be more than one such discrete conductive section or short that directly connects the transparent conductor layers 17, 20.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the figures show a particular order for stacking the various layers of the aperture 14, the positions of some of the layers could be changed while still achieving similar results. Also, although not in all of the figures, certain other layers that do not change the concepts described above may be added. For example, there may be an anti-reflection coating applied to the substrate, before forming the stack-ups depicted for the aperture 14. The description is thus to be regarded as illustrative instead of limiting.

What is claimed is:

1. A portable consumer electronics device comprising:
   a handheld portable device housing; and
   an electronic camera module integrated in the housing, the module having a focusing lens to focus light from a scene, an imaging sensor to receive the focused light, and an electro-optic variable aperture to allow different amounts of the light from the scene to reach the imaging sensor through an imaging path,
   wherein the aperture has an aperture stack that includes a front transparent conductor medium, an electrolyte medium, an active electro-chromic medium, and a rear transparent conductor medium, and wherein the front and rear transparent conductor mediums are directly connected to each other by a conductive section that is of the same material as the front and rear transparent conductor mediums and located within the imaging path.

2. The device of claim 1 wherein the conductive section is oriented at about ninety degrees relative to the front and rear transparent conductor mediums and is located closer to a center, rather than a periphery, of a cross-section of the imaging path.

3. The device of claim 1 wherein the conductive section is located at about a center of a cross-section of the imaging path, the device further comprising a driver circuit that is to apply an activation voltage to the front and rear transparent conductor mediums so that the aperture becomes least opaque at the conductive section and progressively more opaque further away from the center.

4. The device of claim 1 wherein the electrolyte medium comprises an ion source medium and an ion conduction medium.

5. The device of claim 1 wherein the aperture stack further comprises a front substrate on which the front transparent conductor medium is formed.

6. The device of claim 5 wherein the aperture stack further comprises a rear substrate on which the rear transparent conductor medium is formed.

7. The device of claim 1 wherein the aperture is positioned so that the front transparent conductor medium is closer to the scene than the rear transparent conductor medium.

8. The device of claim 1 further comprising:
   a driver circuit to produce a variable voltage and being coupled to the transparent conductor mediums of the aperture, so as to apply the variable voltage to activate the aperture;

an exposure controller to receive a user-triggered shutter release command and in response signal a) the driver circuit to apply a particular voltage to activate the aperture and b) the imaging sensor to apply a particular integration time, in accordance with a given exposure setting; and a digital image storage coupled to receive a captured digital image from the imaging sensor.

9. The device of claim 1 wherein the handheld portable device housing has a side that joins a front face and a rear face of the housing, and wherein the camera module is oriented in the housing such that the focusing lens is substantially parallel with the rear face of the housing and receives the light from the scene through an opening in the rear face of the housing.

10. The device of claim 1 wherein the electro-chromic medium comprises a layer of electro-chromic material that is substantially perpendicular to an optical axis of the camera module and that has essentially uniform thickness.

11. The device of claim 1 further comprising:
another transparent conductor medium;
another electro-chromic medium sandwiched between the another transparent conductor medium and the rear transparent conductor medium; and
a control circuit that determines voltages to be applied to the transparent conductor mediums in response to a plurality of input desired states including a clear state, an aperture stop state, and a neutral density state.

12. The device of claim 5 wherein the front substrate is the focusing lens of the camera module.

13. The device of claim 5 wherein the front substrate is an external housing wall of the device.

14. An electro-optic variable aperture to control light that passes through an imaging path, the electro-optic variable aperture comprising:
a front transparent conductor medium;
an electrolyte medium;
an active electro-chromic medium;
a rear transparent conductor medium; and
a conductive section located within the imaging path that directly connects the front and rear transparent conductor mediums, the conductive section being of the same material as the front and rear transparent conductor mediums.

15. The electro-optic variable aperture of claim 14 wherein the conductive section is oriented at about ninety degrees relative to the front and rear transparent conductor mediums and is located closer to a center, rather than a periphery, of a cross-section of the imaging path.

16. The electro-optic variable aperture of claim 14 wherein the conductive section is located at about a center of a cross-section of the imaging path, the electro-optic variable aperture further comprising a driver circuit that is to apply an activation voltage to the front and rear transparent conductor mediums so that the electro-optic variable aperture becomes least opaque at the conductive section and progressively more opaque further away from the center.

17. The electro-optic variable aperture of claim 14 wherein the electrolyte medium comprises an ion source medium and an ion conduction medium.

18. The electro-optic variable aperture of claim 14 wherein the electro-chromic medium comprises a layer of electro-chromic material that has essentially uniform thickness and that is substantially perpendicular to an optical axis of the electro-optic variable aperture.

19. The electro-optic variable aperture of claim 14 further comprising:
a third transparent conductor medium;
a second electro-chromic medium sandwiched between the third transparent conductor medium and the rear transparent conductor medium; and
a control circuit that determines voltages to be applied to the transparent conductor mediums in response to a plurality of input desired states including a clear state, an aperture stop state, and a neutral density state.

20. An electro-optic variable aperture to control light that passes through an imaging path, the electro-optic variable aperture comprising:
a front transparent conductor medium;
an electrolyte medium;
an active electro-chromic medium;
a rear transparent conductor medium; and
a conductive section located at a center of the imaging path, the conductive section forming an electrical short directly connecting the front and rear transparent conductor mediums.

21. The electro-optic variable aperture of claim 20 wherein the conductive section is of the same material as the front and rear transparent conductor mediums.

22. The electro-optic variable aperture of claim 20 wherein the conductive section is oriented at about ninety degrees relative to the front and rear transparent conductor mediums.

23. The electro-optic variable aperture of claim 20 wherein the conductive section is located at about a center of a cross-section of the imaging path, the electro-optic variable aperture further comprising a driver circuit that is to apply an activation voltage to the front and rear transparent conductor mediums so that the electro-optic variable aperture becomes least opaque at the conductive section and progressively more opaque further away from the center.

24. The electro-optic variable aperture of claim 20 wherein the electrolyte medium comprises an ion source medium and an ion conduction medium.

25. The electro-optic variable aperture of claim 20 wherein the electro-chromic medium comprises a layer of electro-chromic material that has essentially uniform thickness and that is substantially perpendicular to an optical axis of the electro-optic variable aperture.

26. The electro-optic variable aperture of claim 20 further comprising:
a third transparent conductor medium;
a second electro-chromic medium sandwiched between the third transparent conductor medium and the rear transparent conductor medium; and
a control circuit that determines voltages to be applied to the transparent conductor mediums in response to a plurality of input desired states including a clear state, an aperture stop state, and a neutral density state.

27. An electro-optic variable aperture to control light that passes through an imaging path, the electro-optic variable aperture comprising:
a front transparent conductor medium;
an electrolyte medium;
an active electro-chromic medium;
a rear transparent conductor medium; and
a conductive section located within the imaging path that forms an electrical short directly connecting the front and rear transparent conductor mediums such that an activation voltage applied to the two transparent conductor mediums creates a potential across the active electro-chromic medium that is zero volts at the conductive section and is progressively greater towards a periphery of the imaging path.

28. The electro-optic variable aperture of claim 27 wherein the conductive section is of the same material as the front and rear transparent conductor mediums.

29. The electro-optic variable aperture of claim 27 wherein the conductive section is oriented at about ninety degrees relative to the front and rear transparent conductor mediums and is located closer to a center rather than the periphery of the imaging path.

30. The electro-optic variable aperture of claim 27 further comprising a driver circuit that is to apply the activation voltage to the front and rear transparent conductor mediums.

31. The electro-optic variable aperture of claim 27 wherein the electro-optic variable aperture becomes least opaque at the conductive section and progressively more opaque further away from the conductive section.

32. The electro-optic variable aperture of claim 27 wherein the conductive section is located at about a center of a cross-section of the imaging path.

33. The electro-optic variable aperture of claim 27 wherein the electrolyte medium comprises an ion source medium and an ion conduction medium.

34. The electro-optic variable aperture of claim 27 wherein the electro-chromic medium comprises a layer of electro-chromic material that has essentially uniform thickness and that is substantially perpendicular to an optical axis of the electro-optic variable aperture.

35. The electro-optic variable aperture of claim 27 further comprising:
a third transparent conductor medium;
a second electro-chromic medium sandwiched between the third transparent conductor medium and the rear transparent conductor medium; and
a control circuit that determines voltages to be applied to the transparent conductor mediums in response to a plurality of input desired states including a clear state, an aperture stop state, and a neutral density state.

* * * * *